United States Patent
Akanksha et al.

(10) Patent No.: US 10,796,454 B2
(45) Date of Patent: Oct. 6, 2020

(54) SYSTEM AND METHOD TO DETERMINE COLOR VARIANTS OF A FASHION PRODUCT

(71) Applicant: Myntra Designs Private Limited, Bangalore (IN)

(72) Inventors: Gupta Akanksha, Firozabad (IN); Makkapati Vishnu Vardhan, Bangalore (IN)

(73) Assignee: MYNTRA DESIGNS PRIVATE LIMITED, Bangalore (IN)

( * ) Notice: Subject to any disclaimer, the term of this patent is extended or adjusted under 35 U.S.C. 154(b) by 161 days.

(21) Appl. No.: 16/034,682

(22) Filed: Jul. 13, 2018

(65) Prior Publication Data

US 2019/0019314 A1 Jan. 17, 2019

(51) Int. Cl.
*G06T 7/90* (2017.01)
*G06K 9/00* (2006.01)
*G06Q 30/06* (2012.01)
*G06K 9/62* (2006.01)

(52) U.S. Cl.
CPC ............. *G06T 7/90* (2017.01); *G06K 9/6271* (2013.01); *G06Q 30/0631* (2013.01); *G06T 2207/20081* (2013.01)

(58) Field of Classification Search
CPC ............. G06Q 30/0631; G06Q 30/02; G06Q 30/0601; G06Q 30/0641; G06Q 30/0633; G06Q 30/0629; G06Q 30/06432; G06K 9/66; G06K 9/6215; G06K 9/6217; G06K 9/4642; G06K 9/4647; G06K 9/4652; G06K 9/6271; G06T 7/13; G06T 7/90; G06F 17/30247; G06F 17/3025; G06F 17/30256; G06F 17/30268; G06F 17/30277; G06F 17/3053; G06F 17/30867
See application file for complete search history.

(56) References Cited

U.S. PATENT DOCUMENTS

| | | | | |
|---|---|---|---|---|
| 6,728,706 | B2 * | 4/2004 | Aggarwal | G06Q 30/02 |
| 2002/0138481 | A1 * | 9/2002 | Aggarwal | G06Q 30/02 |
| 2012/0303615 | A1 * | 11/2012 | Goswami | G06Q 30/02 707/723 |

* cited by examiner

*Primary Examiner* — Duy M Dang
(74) *Attorney, Agent, or Firm* — Harness, Dickey & Pierce, P.L.C.

(57) ABSTRACT

A system and method for determining color variants of a fashion product is provided. A system for determining a color variant of a fashion product is provided. The system comprises a categorization module configured to receive a plurality of images corresponding to a plurality of fashion products and configured to categorize the plurality of images into a plurality of styles. The system further includes a color variant determination module configured to compute a plurality of embeddings for the corresponding plurality of images, compute a mean value for the plurality of embeddings and compare each embedding to one or more predefined constraints to determine whether the embedding belongs to a color variant set.

15 Claims, 4 Drawing Sheets ions of techniques used to train a color variant determination module, implemented according to the aspects of the present technique;

SYSTEM AND METHOD TO DETERMINE COLOR VARIANTS OF A FASHION PRODUCT

PRIORITY STATEMENT

The present application claims priority under 35 U.S.C. § 119 to Indian patent application number 201741025175 filed 15 Jul. 2017, the entire contents of which are hereby incorporated herein by reference.

FIELD

The invention relates generally to e-commerce platforms and more particularly to a system and method to determine color variants of a fashion product.

BACKGROUND

Most fashion e-commerce platforms are built such as to enable customers to easily navigate through the hundreds of products that are offered for sale. Customer experience is greatly enhanced when products are easily found instead of having to browse through thousands of similar products. Most fashion e-commerce portals use recommendation engines to recommend styles based on the browsing profile of the customer.

One important aspect of recommending related products is to ensure that the color variants of a product are readily displayed to the customer. In general, different colors of a specific product are usually referred to as color variants. By readily displaying the available color variants for a product of interest, the customer is spared the arduous task of manually browsing for alternate colors of a product.

Given the large number of products that are available on e-commerce platforms, especially in the fashion sector, there is a need for product catalogues to be continuously updated. In most systems, the color variants are manually identified from a plurality of images. However, the manual categorization of color variants is a laborious process and is often subjective, especially when categorization is image based. In addition, it may be impractical for manual handling of large amounts of data as the number of products on the catalogue keeps increasing over time.

Another method customers use for identifying color variants of a desired product is by searching the product catalogue based on attributes of each product such as brand, article type, gender and price. However, there is a possibility that these attributes were not captured accurately during the categorization of products, which would lead to the display of wrong products and/or color variants to the customer which ultimately leads to decreased customer satisfaction.

Therefore, there is a need for an automatic and accurate system and method for identifying and categorizing color variants on a fashion e-commerce portal.

SUMMARY

The following summary is illustrative only and is not intended to be in any way limiting. In addition to the illustrative aspects, example embodiments, and features described, further aspects, example embodiments, and features will become apparent by reference to the drawings and the following detailed description. Example embodiments provide a system for determining color variants of a fashion product for categorization on a fashion e-commerce platform.

Briefly, according to an example embodiment, a system for determining a color variant of a fashion product is provided. The system comprises a categorization module configured to receive a plurality of images corresponding to a plurality of fashion products and configured to categorize the plurality of images into a plurality of styles. The system further includes a color variant determination module configured to compute a plurality of embeddings for the corresponding plurality of images, compute a mean value for the plurality of embeddings and compare each embedding to one or more predefined constraints to determine whether the embedding belongs to a color variant set.

According to another example embodiment, a method for determining a color variant of a fashion product is provided. The method comprised categorizing a plurality of images corresponding to a plurality of fashion products into a plurality of styles, computing a plurality of embeddings for the corresponding plurality of images, computing a mean value for the plurality of embeddings and comparing each embedding to one or more predefined constraints to determine whether the embedding belongs to a color variant set.

BRIEF DESCRIPTION OF THE FIGURES

These and other features, aspects, and advantages of the example embodiments will become better understood when the following detailed description is read with reference to the accompanying drawings in which like characters represent like parts throughout the drawings, wherein.

DETAILED DESCRIPTION OF EXAMPLE EMBODIMENTS

Figure 1:
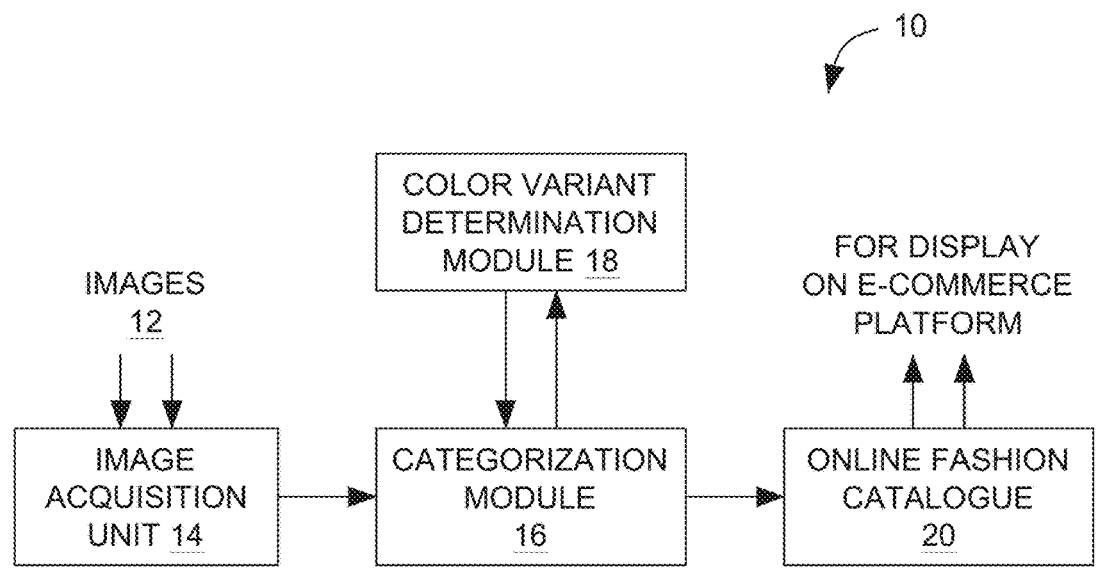
FIG. 1 is a block diagram illustrating one embodiment of fashion e-commerce platform, implemented according to the aspects of the present technique.

Turning to the drawings, FIG. 1 is a block diagram illustrating one embodiment of fashion e-commerce platform, implemented according to the aspects of the present technique. It may be noted that the fashion e-commerce platform as described herein for example purposes only. It may be noted that the techniques described herein may be implemented in any retail platform that display and sell color variants of various products. The fashion e-commerce system 10 includes an image acquisition unit 14, a categorization module 16, a color variant determination module 18 and an online fashion catalogue 20. Each component is described in further detail below.

Image acquisition unit 14 is configured to access images 12 of fashion products. In general, images 12 refer to images captured by an image sensor such as a camera, of each fashion product listed on the e-commerce system. As used herein, a fashion product may refer to apparel such as top wear, bottom wear or accessories such as footwear, bags, and the like. In some embodiments, the images 12 may be accessed from an image repository (not shown). In a further embodiment, the images 12 are acquired real time.

Categorization module 16 is configured to receive images 12 from the image acquisition module. In one embodiment, the images 12 are categorized into a plurality of styles. On most e-commerce platforms, the products are categorized based on the article type, brand, gender and any other categorization head that may be appropriate.

Color variant determination module 18 is configured to determine one or more color variant sets from the images 12. It may be noted that the images 12 correspond to multiple styles, and each style may have one or more color variants or none at all. The color variant determination module 18 is configured to identify the color variant sets that exist for each style from the images received.

In one embodiment, the color variant determination module is configured to compute a plurality of embeddings for the images 12 and further compute a mean value for the plurality of embeddings. The color variant module is further configured to compare each embedding to one or more predefined constraints to determine whether the embedding belongs to a color variant set. In one embodiment, the one or more predefined constraints comprises a distance between a selected embedding, hereinafter referred to as seed and the mean value. In another embodiment, the one or more predefined constraints comprises an angle between a pair of seeds subtended at the mean value.

In one embodiment, an embedding refers to an n-dimensional feature vector extracted from the images of the fashion products corresponding to a style. In one embodiment, color variant determination module 18 comprises neural networks and is trained by implementing deep learning models to understand color variants. Further, the color variant determination module is trained by using thousands of images of existing styles and their corresponding color variants.

The online fashion catalogue 20 comprises a listing of all products that are on offer for sale on the fashion e-commerce platform. The online fashion catalogue 20 is displayed to all customers accessing the e-commerce platform. The online fashion catalogue 20 is presented to the user via a user interface (not shown).

In order to identify color variants for a set of new images (corresponding to new styles), the color variant determination module is first trained using images corresponding to existing styles of fashion products. The manner in which color variant determination module 18 is trained is described in further detail below.

Figure 2A:
FIGS. 2(a), 2(b) and 2(c) are diagrammatic representations of techniques used to train a color variant determination module, implemented according to the aspects of the present technique.
Figure 2B:
Figure 2C:
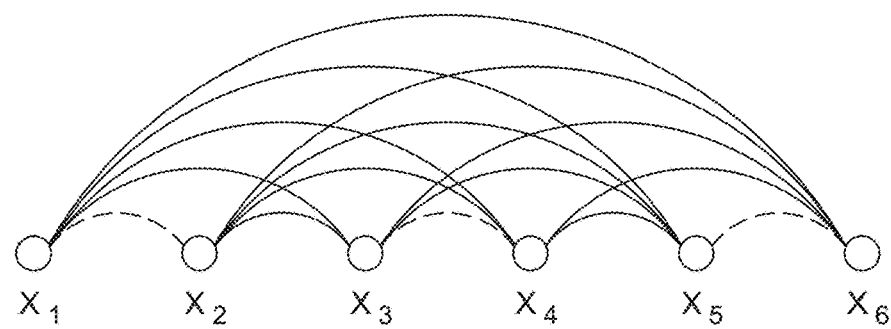

FIGS. 2(*a*), 2(*b*) and 2(*c*) are diagrammatic representations of techniques used to train a color variant determination module. In one embodiment, the color variant determination module is trained to identify color variants using a set of images corresponding to existing fashion products. Each step is described in further detail below.

In one embodiment, the color variant determination module comprises training a deep learning similarity network such as a Siamese as shown in FIG. 2(*a*), Triplet as shown in FIG. 2(*b*) or Lifted Structure Embedding as shown in FIG. 2(*c*). The output of any layer of the network can be tapped to obtain an n-dimensional embedding. In one embodiment, the penultimate layer is tapped into to obtain the embedding. The network is trained using the images of existing color variants such that the distance between embeddings of color variants is less while that between non-color variants is high. It may be noted that an embedding represents each style in totality and is not dependent on variance or color distribution of the image. This ensures that, color variants for a specific style will have similar embedding. IN FIG. 2(*a*), FIG. 2(*b*) and FIG. 2(*c*) similar images are depicted using dashed lines and dissimilar images corresponding to non-color variants are depicted using solid lines.

For example, as illustrated in FIG. 2(*a*), Siamese network is trained on the paired data $\{(X_i, X_j, Y_{ij})\}$. Intuitively, the contrastive training minimizes the distance between a pair of examples with the same class label and penalizes the negative pair distances for being smaller than the margin parameter $\alpha$. Concretely, the cost function is defined as, $$J = \frac{1}{m}\sum_{(i,j)}^{m/2} y_{i,j}D_{i,j}^2 + (1-y_{i,j})[\alpha - D_{i,j}]_+^2$$

where m stands for the number of images in the batch, f(.) is the feature embedding output from the network, $D_{ij}=\|f(X_i)-f(X_j)\|_2$, and the label $y_{ij}\in\{0;1\}$ indicates whether a pair $(X_i; X_j)$ is from the same class or not. The [.]+ operation indicates the hinge function max(0).

In another example as illustrated in FIG. 2 (*b*), triplet network is trained on the triplet data $\{(X_a^{(i)}, X_p^{(i)}, X_n^{(i)})\}$ where $(X_a^{(i)}, X_p^{(i)})$ have the same class labels and have different class labels. The term is referred to as an anchor of a triplet. Intuitively, the training process encourages the network to find an embedding where the distance between $X_a^{(i)}$ and $X_n^{(i)}$ is larger than the distance between $X_a^{(i)}$ and $X_p^{(i)}$ plus the margin parameter $\alpha$. The cost function is defined as, $$J = \frac{3}{2m}\sum_i^{m/3}[D_{ia,ip}^2 - D_{ia,in}^2 + \alpha]_+ \text{ where}$$

$$D_{ia,ip} = \|f(X_i^a) - f(X_i^p)\| \text{ and}$$

$$D_{ia,in} = \|f(X_i^a) - f(X_i^n)\|.$$

In another embodiment, as illustrated in FIG. 2(*c*), Lifted Structure Embedding (LSE) is applied. LSE optimizes the error in the given batch of images presented at a time such that the distance between embeddings of all pairs of color variants is less while that between the remaining pairs (negative) is more. The optimization is repeated in multiple batches till all the color variant sets are included (i.e., all the input styles of color variants are used for training). The network is trained to learn these relations and penalize the loss function for the pair which doesn't belong to the same color variant class.

To train the network, permutations of the images in a set of color variants are trained to be similar while those across sets are trained to be dissimilar. The color variants are further grouped into super classes based on their predominant attribute (e.g., pattern). The network is trained such that the images across the super classes are much farther apart. Examples of various super classed are described below.

Figure 3:
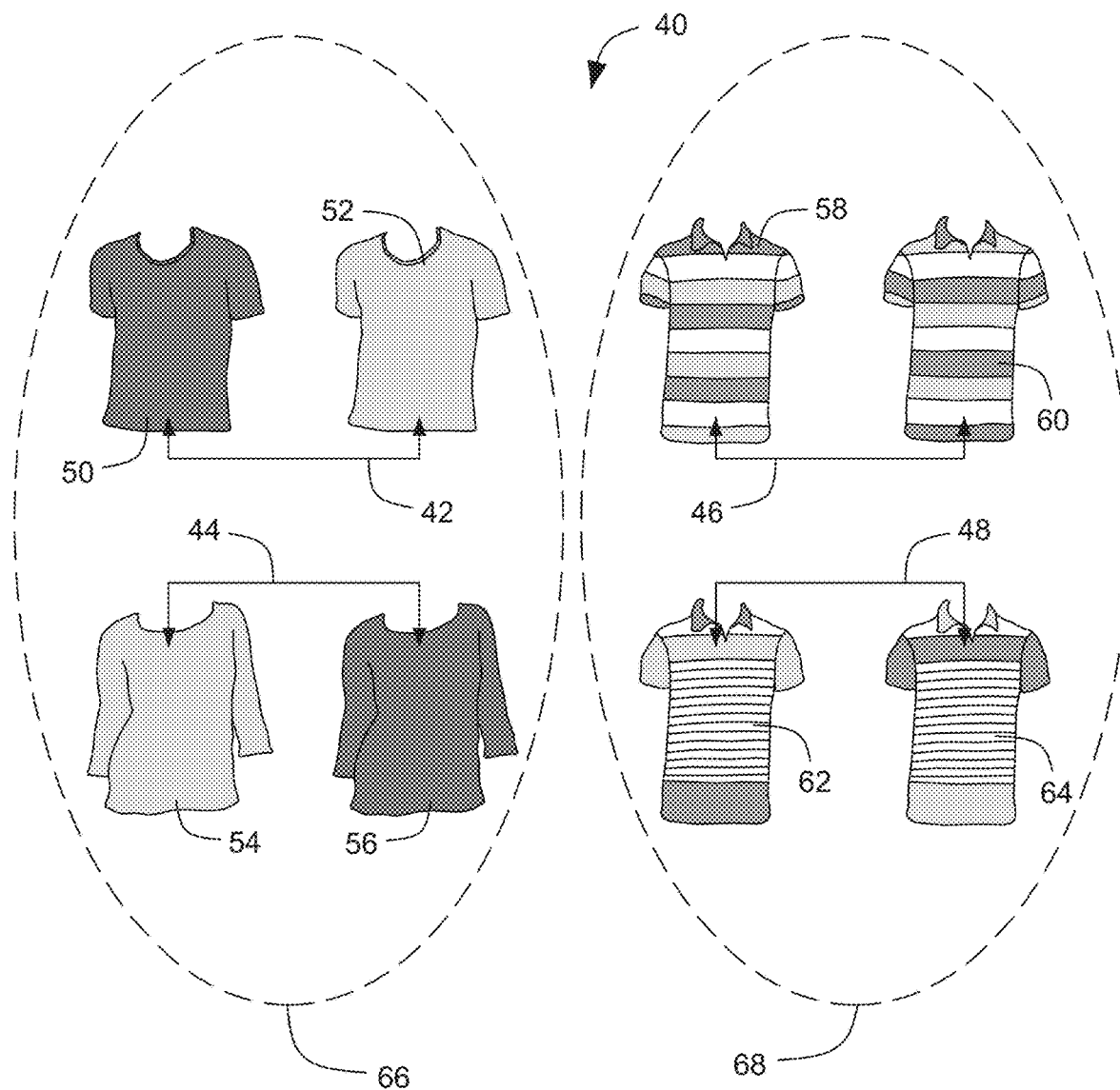
FIG. 3 is a diagrammatic representation of classes and super classes, implemented according to the aspects of the present technique.

FIG. 3 is a diagrammatic representation of classes and super classes, implemented according to the aspects of the present technique. In the illustrated example, class 42 included shirt 50 and shirt 52 form a set of color variants of a first style. Similarly, class 44 includes shirt 54 and shirt 56 which form a set color variants of a second style. However, it may be noted that both classes have a unique attribute as it comprises a solid color. Therefore, although the sets have different styles, both classes belong to superclass 66.

Similarly, class 46 includes shirt 58 and shirt 60 which are color variants of a third style. Similarly, class 48 includes shirt 62 and shirt 64 which are color variants of a fourth style. Since both class 46 and 48 have a unique attribute that is a stripe pattern, together they form superclass 66.

Figure 4:
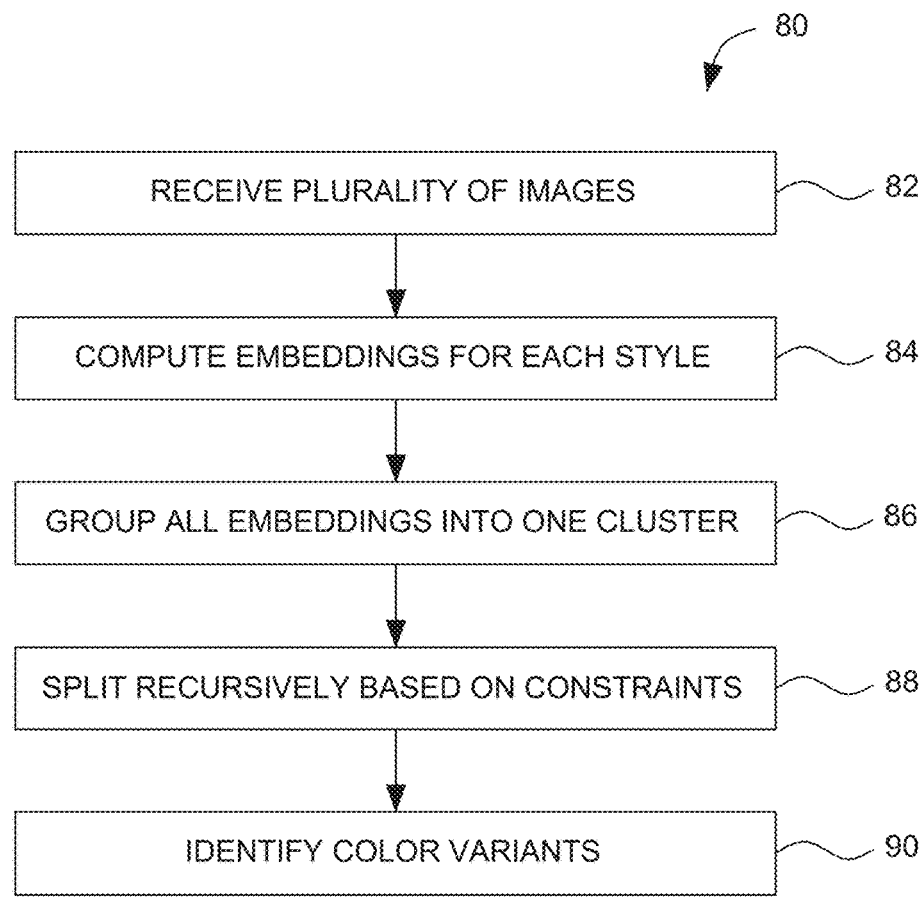
FIG. 4 is a flow diagram illustrating one method for determining color variants for a batch of new styles, implemented according to the aspects of the present technique.

FIG. 4 is a flow diagram illustrating one method for determining color variants for a batch new styles, implemented according to the aspects of the present technique. As described above, the color variant determination module is first trained to identify color variants by using batch of images corresponding to existing styles. Once trained, the color variant determination module is configured to identify color variants from a batch of images corresponding to new styles. Each step is described in further detail below.

At step 82, a plurality of images corresponding to new styles are received. At step 84, an embedding for each image is computed. In one embodiment, an output of any layer of a deep learning network is referred as the embedding. For example, the output of the penultimate layer of a Siamese/Triplet/LSE is referred as the embedding.

At step 86, all the embeddings are grouped into one cluster. In one embodiment, it is assumed that all the images are color variants and initially belong to one cluster.

At step 88, the cluster is split recursively into two or more clusters based on one or more constraints which will be described in further detail with reference to FIG. 5. The clusters are further split till the constraints are met for each cluster.

At step 90, one or more color variants are identified based on a tree structure that are formed by the splitting of clusters. In one embodiment, points in the leaf nodes constitute a color variant group. It may be noted that a number of points in the leaf nodes may vary. Further, there may be a single point on the leaf node when that style does not belong to any of the color groups. An example by which color variants are determined is described below.

Figure 5:
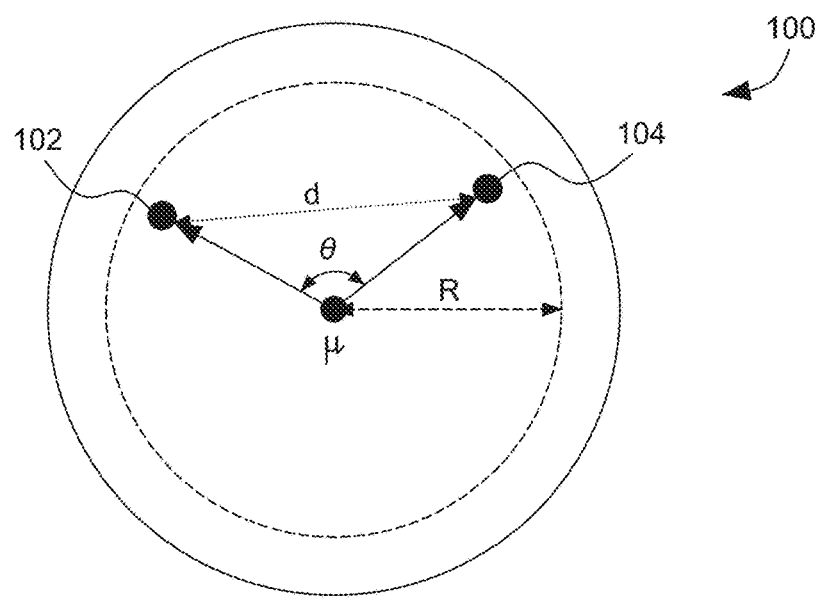
FIG. 5 is an example illustration of a manner in which constraints are defined for clustering of embeddings, implemented according to the aspects of present technique.

FIG. 5 is an example illustration of a manner in which constraints are defined for clustering of embeddings, implemented according to the aspects of present technique. In the illustrated embodiment, the hierarchical clustering is based on Bregman proximity method. In this method, it is first assumed that all embeddings form one cluster and are color variants.

The cluster is then split recursively until defined constraints are satisfied. In one embodiment, the splitting is based on kmeans++ method that creates two new means once a decision on splitting the cluster is made. This decision is taken by computing maximum of the distances of the embeddings from the mean (mu) and checking if it exceeds the maximum ball radius R. In this method, two seeds are selected as representatives of the new clusters.

A first seed 102 corresponding to a first embedding is randomly selected and then a second seed 104 corresponding to a second embedding is selected based on the cumulative distance function (CDF). Further, distances of all seeds (within the cluster) to the first seed are computed, and then summed in succession to obtain the cumulative distance function.

In one embodiment, the second seed 104 is selected such that it is farther away from the first seed so that the two new clusters are well separated. For example, a random value between the minimum and maximum values of the CDF is picked and a point on the CDF closest to it may be chosen as the second seed. For better separation of clusters, an angle 'θ' between the first seed 102 and second seed 104 subtended at the mean is also computed.

Pre-defined constraints are applied to identify the seeds such that they belong to different color variant sets. For example, the distance between the seeds 102 and 104 should be greater than 'R/2', wherein R is maximum ball radius which refers to the distance of the embeddings in a cluster from the mean value. Another pre-defined constraint is that angle 'θ' is greater than or equal to 90. By applying these pre-defined constraints on the seeds, the clusters are split recursively till the color variants are identified.

Figure 6:
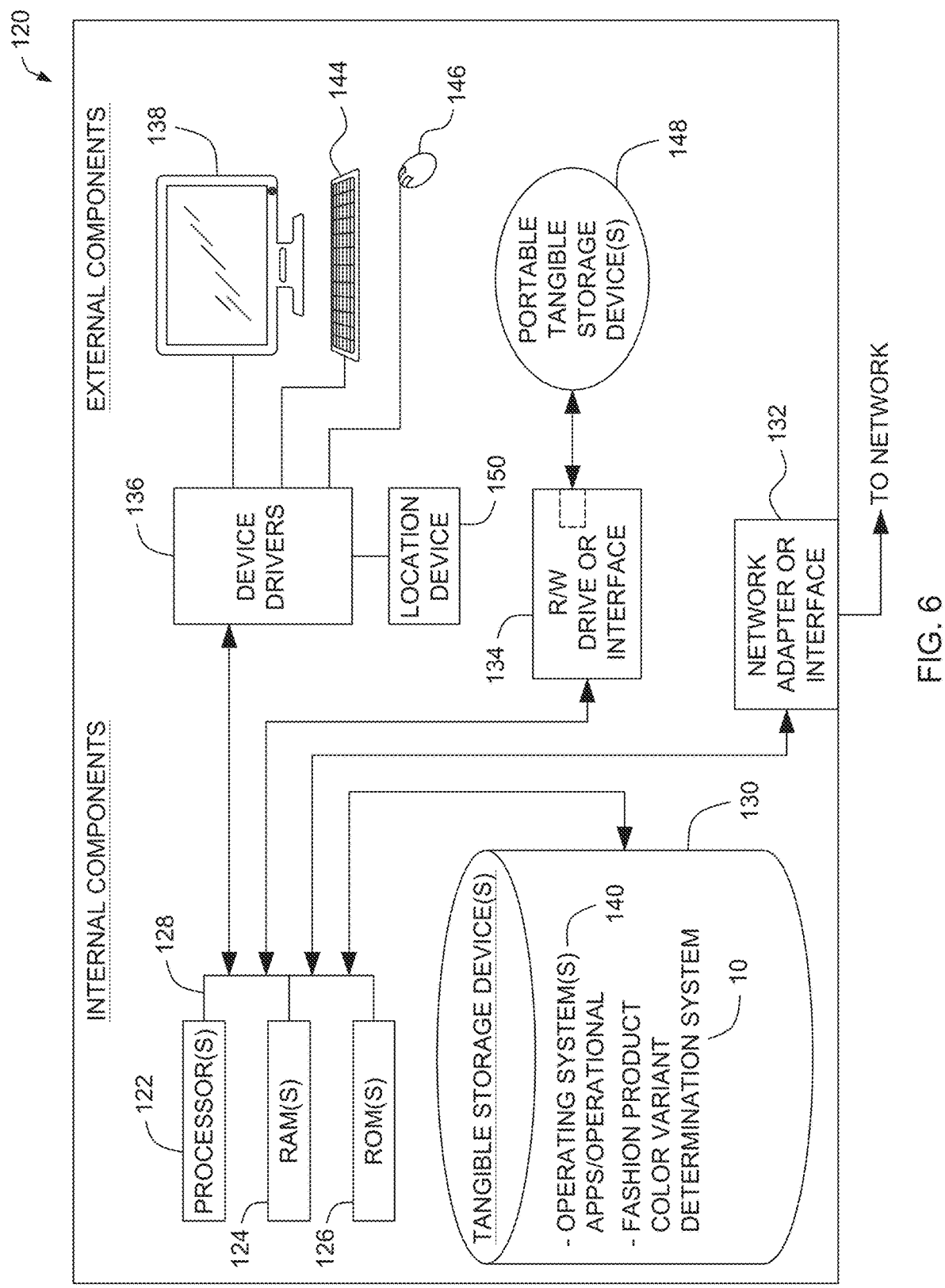
FIG. 6 is a block diagram of an embodiment of a computing device in which the modules of a fashion e-commerce platform, described herein, are implemented.

The modules of the system 10 described herein are implemented in computing devices. One example of a computing device 120 is described below in FIG. 6. The computing device includes one or more processor 122, one or more computer-readable RAMs 124 and one or more computer-readable ROMs 126 on one or more buses 128. Further, computing device 120 includes a tangible storage device 130 that may be used to execute operating systems 140 and the system 10. The various modules of the system 10 includes an image acquisition unit 14, a categorization module 16, a color variant determination module 18 and an e-commerce user interface 20 and may be stored in tangible storage device 130. Both, the operating system 140 and the system 10 are executed by processor 122 via one or more respective RAMs 124 (which typically include cache memory). The execution of the operating system 140 and/or the system 10 by the processor 122, configures the processor 122 as a special purpose processor configured to carry out the functionalities of the operation system 140 and/or the system 10, as described above.

Examples of storage devices 130 include semiconductor storage devices such as ROM 156, EPROM, flash memory or any other computer-readable tangible storage device that may store a computer program and digital information.

Computing device also includes a R/W drive or interface 134 to read from and write to one or more portable computer-readable tangible storage devices 148 such as a CD-ROM, DVD, memory stick or semiconductor storage device. Further, network adapters or interfaces 132 such as a TCP/IP adapter cards, wireless Wi-Fi interface cards, or 3G or 4G wireless interface cards or other wired or wireless communication links are also included in computing device.

The various modules of the system 10 includes an image acquisition unit 14, a categorization module 16, a color variant determination module 18 and an e-commerce user interface 20 and may be stored in tangible storage device 130 and may be downloaded from an external computer via a network (for example, the Internet, a local area network or other, wide area network) and network adapter or interface 132.

Computing device further includes device drivers 136 to interface with input and output devices. The input and output devices may include a computer display monitor 138, a keyboard 144, a keypad, a touch screen, a computer mouse 146, and/or some other suitable input device.

The afore mentioned description is merely illustrative in nature and is in no way intended to limit the disclosure, its application, or uses. The broad teachings of the disclosure may be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the example embodiments is described above as having certain features, any one or more of those features described with respect to any example embodiment of the disclosure may be implemented in and/or combined with features of any of the other embodiments, even if that combination is not explicitly described. In other words, the described example embodiments are not mutually exclusive, and permutations of one or more example embodiments with one another remain within the scope of this disclosure.

While only certain features of several embodiments have been illustrated, and described herein, many modifications and changes will occur to those skilled in the art. It is, therefore, to be understood that the appended claims are intended to cover all such modifications and changes as fall within the true spirit of inventive concepts.

The invention claimed is:

1. A system for determining a color variant of a fashion product, the system comprising:
    one or more memories configured to store one or more computer programs; and
    one or more processors configured to, upon execution of the one or more computer programs,
        receive a plurality of images corresponding to a plurality of fashion products
        categorize the plurality of images into a plurality of styles,
        compute a plurality of embeddings for the corresponding plurality of images,
        compute a mean value for the plurality of embeddings, and
        compare each embedding to one or more predefined constraints to determine whether the embedding belongs to a color variant set.

2. The system of claim 1, wherein the one or more predefined constraints comprises a distance between a seed and the mean value.

3. The system of claim 2, wherein the one or more predefined constraints comprises an angle between a pair of seeds subtended at the mean value.

4. The system of claim 1, wherein the one or more processors are configured to be trained to group the plurality of styles into one or more classes.

5. The system of claim 4, wherein the one or more processors is further configured to be trainable to understand the embeddings within each class are similar.

6. The system of claim 4, wherein the one or more processors is further configured to be trainable to group a set of classes into a super class.

7. The system of claim 1, wherein the one or more processors is further configured to form a plurality of clusters, wherein the plurality of clusters are recursively split into relatively smaller clusters based on the one or more predefined constraints.

8. The system of claim 7, wherein the one or more processors is further configured to implement a Bregman proximity model to form the plurality of clusters.

9. The system of claim 1, wherein the embeddings comprise n-dimensional feature vectors extracted from the plurality of images.

10. A method for determining a color variant of a fashion product, the method comprising:
    categorizing a plurality of images corresponding to a plurality of fashion products into a plurality of styles;
    computing a plurality of embeddings for the corresponding plurality of images;
    computing a mean value for the plurality of embeddings; and
    comparing each embedding to one or more predefined constraints to determine whether the embedding belongs to a color variant set.

11. The method of claim 10, further comprising identifying a set of selected styles as color variants upon a maximum distance between the plurality of embeddings and the mean value being less than a pre-defined value.

12. The method of claim 10, further comprising forming a cluster comprising a plurality of embeddings and recursively splitting the cluster based on a plurality of constraints.

13. The method of claim 12, wherein the cluster is split based on a distance between two seeds and an angle between the two seeds subtended at the mean value.

14. The method of claim 13, wherein the plurality of constraints comprises a pre-determined value of the distance and a threshold value of the angle.

15. The method of claim 10, wherein the plurality of embeddings comprise n-dimensional feature vector extracted from the plurality of images corresponding to the plurality of fashion products.

* * * * *

UNITED STATES PATENT AND TRADEMARK OFFICE
CERTIFICATE OF CORRECTION

| | | |
|---|---|---|
| PATENT NO. | : 10,796,454 B2 | Page 1 of 1 |
| APPLICATION NO. | : 16/034682 | |
| DATED | : October 6, 2020 | |
| INVENTOR(S) | : Gupta Akanksha et al. | |

It is certified that error appears in the above-identified patent and that said Letters Patent is hereby corrected as shown below:

On the Title Page

Add:
(30) Foreign Application Priority Data
July 15, 2017   (IN)   201741025175

Signed and Sealed this
Ninth Day of February, 2021

Drew Hirshfeld
*Performing the Functions and Duties of the*
*Under Secretary of Commerce for Intellectual Property and*
*Director of the United States Patent and Trademark Office*